US011358606B2

(12) United States Patent
Merfels et al.

(10) Patent No.: US 11,358,606 B2
(45) Date of Patent: Jun. 14, 2022

(54) METHOD FOR OPERATING A MOTOR VEHICLE FOR IMPROVING WORKING CONDITIONS OF EVALUATION UNITS IN THE MOTOR VEHICLE, CONTROL SYSTEM FOR PERFORMING A METHOD OF THIS KIND, AND MOTOR VEHICLE HAVING A CONTROL SYSTEM OF THIS KIND

(71) Applicants: AUDI AG, Ingolstadt (DE); VOLKSWAGEN AKTIENGESELLSCHAFT, Wolfsburg (DE)

(72) Inventors: Christian Merfels, Braunschweig (DE); Bernd Rech, Bokensdorf (DE); Daniel Wilbers, Wolfsburg (DE); Thilo Schaper, Lehrte (DE); Constanze Hungar, Braunschweig (DE); Niklas Koch, Wolfsburg (DE); Florian Haubner, Ingolstadt (DE); Simon Seitle, Karlshuld (DE)

(73) Assignees: AUDI AG, Ingolstadt (DE); VOLKSWAGEN AKTIENGESELLSCHAFT, Wolfsburg (DE)

( * ) Notice: Subject to any disclaimer, the term of this patent is extended or adjusted under 35 U.S.C. 154(b) by 80 days.

(21) Appl. No.: 17/053,590

(22) PCT Filed: May 8, 2019

(86) PCT No.: PCT/EP2019/061809
§ 371 (c)(1),
(2) Date: Nov. 6, 2020

(87) PCT Pub. No.: WO2019/215222
PCT Pub. Date: Nov. 14, 2019

(65) Prior Publication Data
US 2021/0229690 A1     Jul. 29, 2021

(30) Foreign Application Priority Data

May 8, 2018 (DE) .................... 10 2018 111 070.7

(51) Int. Cl.
*B60W 50/10*    (2012.01)
*B60W 30/08*    (2012.01)
*B60W 50/00*    (2006.01)

(52) U.S. Cl.
CPC ............ *B60W 50/10* (2013.01); *B60W 30/08* (2013.01); *B60W 2050/0014* (2013.01); *B60W 2050/0018* (2013.01)

(58) Field of Classification Search
CPC ................ B60W 50/10; B60W 30/08; B60W 2050/0014; B60W 2050/0018;
(Continued)

(56) References Cited

U.S. PATENT DOCUMENTS

| 8,798,841 B1* | 8/2014 | Nickolaou ......... B62D 15/0265 701/28 |
| 9,760,092 B2* | 9/2017 | Ferguson ............. G05D 1/0214 |
| 10,678,230 B2* | 6/2020 | Takama ................ B60W 50/14 |

FOREIGN PATENT DOCUMENTS

| DE | 10 2014 102 762 A1 | 9/2014 |
| DE | 10 2013 019 145 A1 | 5/2015 |

(Continued)

OTHER PUBLICATIONS

German Office Action dated Mar. 13, 2019, in German Patent Application No. 10 2018 111 070.7.
(Continued)

*Primary Examiner* — Jeff A Burke
*Assistant Examiner* — Sihar A Karwan
(74) *Attorney, Agent, or Firm* — Staas & Halsey LLP

(57) ABSTRACT

A method for operating a motor vehicle incorporates polling regarding the control of the motor vehicle, leading to an
(Continued)

improvement in the working conditions of a plurality of evaluation units accessing sensor units of the motor vehicle. Control commands for controlling the motor vehicle are determined from this polling by a conflict checking unit. The conflict checking unit determines the feasibility of the control commands, taking into consideration predetermined verification criteria with regard to conflicts between the individual control commands and the practicability of the individual control commands. The conflict checking unit also determines a control specification for a vehicle control unit based on the feasibilities and certain decision criteria. Finally, the motor vehicle is controlled by use of the vehicle control unit in accordance with the control specification.

20 Claims, 2 Drawing Sheets

(58) Field of Classification Search
CPC . B60W 2050/0006; B60W 2050/0091; B60W 30/143; B60W 30/16; B60W 30/18163; B60W 30/12

See application file for complete search history.

(56) References Cited

FOREIGN PATENT DOCUMENTS

| DE | 10 2014 224 665 A1 | 6/2016 |
|---|---|---|
| DE | 10 2018 111 070.7 | 11/2019 |
| WO | PCT/EP2019/061809 | 5/2019 |

OTHER PUBLICATIONS

International Search Report dated Aug. 5, 2019, in International Application No. PCT/EP2019/061809, with English translation.
Written Opinion dated Aug. 5, 2019, in International Application No. PCT/EP2019/061809.
International Preliminary Report on Patentability dated Nov. 19, 2020, in International Patent Application No. PCT/EP2019/061809, 16 pages including translation.

\* cited by examiner

METHOD FOR OPERATING A MOTOR VEHICLE FOR IMPROVING WORKING CONDITIONS OF EVALUATION UNITS IN THE MOTOR VEHICLE, CONTROL SYSTEM FOR PERFORMING A METHOD OF THIS KIND, AND MOTOR VEHICLE HAVING A CONTROL SYSTEM OF THIS KIND

CROSS REFERENCE TO RELATED APPLICATIONS

This application is a U.S. national stage of International Application No. PCT/EP2019/061809, filed on May 8, 2019. The International Application claims the priority benefit of German Application No. 10 2018 111 070.7 filed on May 8, 2018. Both International Application No. PCT/EP2019/061809 and German Application No. 10 2018 111 070.7 are incorporated by reference herein in their entirety.

BACKGROUND

Described herein is a method for operating a motor vehicle for improving working conditions of evaluation units of the motor vehicle accessing multiple sensor units of the motor vehicle, to a control system for operating a motor vehicle with such a method as well as to a motor vehicle with such a control system.

Motor vehicles designed for automated driving usually include control units for planning and controlling travel routes, driving maneuvers and drive trajectories. Upon traveling on the planned drive trajectories, information about the current environment of the motor vehicle is collected by use of corresponding sensor devices of the motor vehicle. However, in certain circumstances, unfavorable visibility conditions for example exist such that the sensor devices less extensively detect the current environment of the motor vehicle due to unfavorable working conditions.

In German Patent Application No. 10 2014 102 762 A1, a method for improving the sensor view of a motor vehicle is described. Within the scope of this method, it is determined and examined if a lateral movement of the motor vehicle is suitable to achieve an improvement of the sensor view.

In U.S. Pat. No. 9,760,092 B2, a method is described, by which a field of view of an autonomously driving motor vehicle can be changed if a sensor of the motor vehicle registers an at least partially covered field of view. Thereupon, a desired field of view is determined and it is achieved by a corresponding movement, speed change or orientation change of the motor vehicle that this desired field of view can be detected by the sensor.

SUMMARY

Described herein is a solution, by which a motor vehicle with multiple sensor units is controlled such that advantageous and reasonable working conditions are achieved for the sensor units.

Described herein is a method for operating a motor vehicle for improving working conditions of evaluation units of the motor vehicle as well as by a control system for performing such a method.

The method described herein for operating a motor vehicle is designed for a motor vehicle, which includes multiple evaluation units accessing sensor units of the motor vehicle, a conflict checking unit and a vehicle control unit for controlling the motor vehicle. This method includes the following operations: first, ascertainment of requests relating to the control of the motor vehicle for improving working conditions of multiple of the evaluation units accessing the sensor units is effected by the evaluation units. Subsequently, communication of the ascertained requests to the conflict checking unit and ascertainment of control commands for controlling the motor vehicle by the vehicle control unit for practicing the communicated requests effected by the conflict checking unit occurs. Thereupon, ascertainment of a respective feasibility of the ascertained control commands considering predetermined verification criteria with respect to contradictions of the individual control commands to each other as well as a practicability of the individual control commands as well as ascertainment of a control specification for the vehicle control unit of the motor vehicle based on the ascertained feasibilities of the control commands and considering predetermined decision criteria are effected. Subsequently, control of the motor vehicle according to the ascertained control specification occurs by use of the vehicle control unit.

Thus, the method is designed for a motor vehicle, which includes a vehicle sensor technology with corresponding data processing components, an evaluation component for evaluating sensor signals, the so-called conflict checking unit as well as a control unit, which is configured at least for braking, accelerating and steering the motor vehicle. Within the scope of the method, the evaluation units of the sensor units of the motor vehicle, that is the sensor technology with the corresponding data processing components, first determine that the working conditions of at least one of the sensor units are currently not ideal. Thereupon, the concerned evaluation unit, which accesses the at least one sensor unit, transmits a corresponding message, that is a request for improving the working conditions of the evaluation unit, to the conflict checking unit. Thereupon, this conflict checking unit develops a driving strategy, that is a control command for controlling the motor vehicle to comply with the request of the evaluation unit.

However, this control command is not directly communicated to the vehicle controller and performed by it, but a control operation of the conflict checking unit is first effected. Herein, it is taken into account that not only one request is usually communicated to the conflict checking unit, but multiple such requests from different evaluation units are present. In the case of multiple requests to the conflict checking unit, it evaluates considering preset rules if individual requests appear to be contrary and if these requests are generally realizable by a corresponding control of the motor vehicle. Thus, the preset rules considered herein are predetermined verification criteria with respect to the feasibility of the previously ascertained control commands.

In the next operation, a concrete control strategy for the motor vehicle is determined, wherein the previously ascertained feasibilities of the control commands as well as further target setting specifications, the so-called predetermined decision criteria, are taken into account. As soon as this control strategy, the so-called control specification for the vehicle control unit of the vehicle, has been ascertained, the implementation of this control specification is effected by corresponding control of the motor vehicle.

If a motor vehicle for example includes multiple external sensors such as cameras, radar devices or lidar devices in the front, rear and lateral area of the motor vehicle, wherein the sensor data of the individual sensor units is each processed by corresponding evaluation units, the method can for example be performed if multiple evaluation units of sensor units communicate requests to the conflict checking unit since they demand a change of the vehicle control for improving the working conditions of the individual sensor units. Thus, the evaluation units of the sensor units for example continuously ascertain in predetermined time intervals of typically several milliseconds if their current working conditions should be improved. For example, if another motor vehicle traveling in the same direction is immediately in front of the motor vehicle, a restriction of the viewing range of the front camera of the motor vehicle can occur. At the same time, it is possible that a motor vehicle traveling behind the motor vehicle also moves immediately behind the motor vehicle due to particularly heavy traffic, such that the viewing range of the rear camera is also restricted. In such a situation, both camera units, that is the front camera and the rear camera, communicate a request for improving their working conditions to the conflict checking unit via their respective evaluation units. This request can be communicated either in the form of a concrete request with respect to the change of the control of the motor vehicle, for example as a concrete command to drive further left on the current lane. Alternatively thereto, the request for improving the working condition can also only include the information that the respective field of view of the front and rear cameras is restricted in the current driving situation. That is, the request for improving working conditions does not necessarily contain concrete information for implementing the measures for improving the working conditions of the corresponding sensor units. After these requests for improving working conditions have been communicated from the individual evaluation units to the conflict checking unit, it ascertains the associated concrete control commands for controlling the motor vehicle, which could fundamentally be implemented by the vehicle control unit. These control commands can for example contain details about how much further left on the lane the motor vehicle should travel or information about a desired speed, which is required to increase or decrease the distance to motor vehicles traveling in front of or behind the motor vehicle.

In the next operation, it is ascertained by the conflict checking unit to what extent the individual ascertained control commands are free of contradiction and implementable. For example, if the conflict checking unit ascertains that a reduction of the speed of the motor vehicle would be reasonable due to the request of the evaluation unit of the front camera, but a request of the evaluation unit of the rear camera would result in an acceleration of the motor vehicle, these two control commands are contradictive and therefore cannot be implemented at the same time. However, if the request of the evaluation unit of the front camera for example requires drive of the motor vehicle further left, that is a change of the steering of the motor vehicle, but this is not possible due to the current traffic situation as well as the course of the road, this control command would not be feasible due to lack of practicability.

Considering all of the previously ascertained control commands, the conflict checking unit therefore first ascertains the feasibility thereof and then determines concrete control specifications for the vehicle control of the motor vehicle. Herein, additional decision criteria are taken into account, which for example relate to the safety of the vehicle occupants or a comfort measure for the occupants of the motor vehicle. Thereupon, the thus ascertained control specifications are implemented by the vehicle control unit. In the example mentioned heretofore, this control specification can for example provide a speed reduction of the motor vehicle since it has been ascertained within the scope of decision making for determining the control specification that a better view to the front is more reasonable for increasing the driving safety than an improved view in the rear area and therefore the improvement of the working conditions of the front camera is implemented with highest priority.

With the aid of the method, thus, the most reasonable working conditions can be achieved for individual sensor units of a motor vehicle, wherein an optimization of the entire driving behavior of the motor vehicle is effected. With the method, the ascertainment of this optimum control specification for the vehicle control unit of the motor vehicle is particularly advantageously realized considering the verification and decision criteria with a plurality of requests from evaluation units of sensor units. The method is particularly reasonable for a motor vehicle, which is configured at least for partially autonomous and in particular for fully autonomous drive. Such a motor vehicle independently plans its maneuvers and drive trajectories and travels on them, wherein particularly advantageously working evaluation units of sensor units of the motor vehicle are always needed. Thus, the method is particularly reasonable and advantageous for autonomously driving motor vehicles.

In further advantageous configuration, it is provided that the evaluation units access respectively individual sensor units, sensor systems and/or simple assistance systems for ascertaining the requests, wherein data in particular recorded in the motor vehicle and/or communicated to the motor vehicle is provided to the evaluation units. Thus, the individual evaluation units can either access an individual sensor, a system of multiple sensors and/or a driver assistance system, that is an electronic additional device in the motor vehicle for assisting the driver in certain driving situations. In addition, the evaluation units can access data already stored in a storage unit of the motor vehicle and/or data provided to the motor vehicle by an external unit.

An individual sensor unit is for example a front camera, a radar device or an individual lidar device of the motor vehicle. A sensor system for example exists if multiple cameras, such as for example a front camera, a rear camera as well as two lateral cameras in the side mirrors of the motor vehicle, are managed as one sensor system by an individual evaluation unit. In case of an individual sensor unit, such as for example the individual front camera, the evaluation unit can be directly integrated in the sensor unit or be arranged at a central location in the motor vehicle and only receive the sensor data of the sensor unit such as for example the front camera via a communication link with it for evaluation. The driver assistance system, to which an evaluation unit can access, can for example be a lane departure warning system, a parking assist system, a speed control device, a traffic jam pilot or a speed control device. These driver assistance systems are configured to for example ascertain a location of the motor vehicle, the localization thereof in the environment or an object detection of an object in the environment of the motor vehicle within the scope of the execution of their assistance functions. Thus, the requests can also be ascertained by evaluation units of vehicle modules. Thus, corresponding requests of evaluation units of such driver assistance systems or vehicle modules also seek an improvement of working conditions of individual sensors of the motor vehicle. However, the focus of the improvement of the working conditions herein is in achieving improved conditions for evaluation of corresponding data, for example the data for object recognition of objects in the environment of the motor vehicle, the sensor data for localizing the motor vehicle on a map recorded in the motor vehicle or the data for locating the motor vehicle in the vehicle environment.

The data recorded in the motor vehicle, that is stored there, is for example information to a travel of the motor vehicle already effected on the same driving route or previous knowledge of the routing from maps recorded in the motor vehicle. The data communicated to the motor vehicle, which is thus provided by external devices, can for example be data of fleet vehicles, which drive or have driven on the same route. Data obtained from a server unit, an infrastructure management unit or from the Internet to the current driving route or driving situation is also possible. In this way, weather data or details to construction sites or other possible obstacles on the driving route for example provided from the Internet can be taken into account within the scope of the method. Thus, particularly extensive data for ascertaining requests particularly advantageous for improving the working conditions of the evaluation units is available to the evaluation units.

In a further advantageous configuration, it is provided that as a predetermined verification criterion in ascertaining the respective feasibility of the control commands, it is taken into account if contradictive control commands due to multiple requests of one of the evaluation units and/or target conflicts of control commands due to requests of different evaluation units are present and/or the practicability of the control command is possible due to current road conditions, traffic conditions and/or a current travel route of the motor vehicle. The conflict checking unit thus examines if control commands are directed to contrary controls of the motor vehicle and/or if the evaluation units of the sensor units seek controls of the motor vehicle with the aid of the ascertained control commands, which pursue different targets. The individual criteria to define the control commands as contradictive and/or target conflicts of control commands, are recorded in the conflict checking unit by predetermined verification criteria. These verification criteria additionally contain information about how it can be verified if the control commands are actually realizable. Thus, a verification of the practicability of the control commands is additionally effected for ascertaining the feasibility of the control commands. Herein, the current traffic situation, in which the motor vehicle is, that is the current conditions of the road, on which the motor vehicle travels, as well as the traffic there is taken into account. Alternatively or additionally thereto, the practicability of the control commands is dependent on the driving route, on which the motor vehicle travels due to its travel destination.

In ascertaining the feasibility of the control commands, thus, contradictions of the individual control commands as well as the practicability thereof is ascertained. Contradictive control commands can for example be ascertained by the evaluation unit of a sensor system such as for example a camera system of the motor vehicle. For example, if the front camera of the motor vehicle requests reduction of the driving speed for improving its visibility conditions, whereas a rear camera requests acceleration of the motor vehicle to also be able to enlarge its viewing range, these two requests of the evaluation unit of the camera are contradictive. The contradictoriness of the two corresponding control commands ascertained by the conflict checking unit based on the requests would then be determined within the scope of the verification of the feasibility of the control commands.

Target conflicts of control commands are for example present if a front camera wishes to change to the right lane to be able to drive in the shadow and to be less blinded, whereas a lidar device assumes that it can detect more objects from the left lane, whereby the localization of the motor vehicle could be more beneficially performed on the left lane. In this situation, a target conflict between the control commands based on these two requests occurs.

Within the scope of the verification of the practicability of the control commands, it is for example resorted to map information recorded in the motor vehicle, which for example contains details about the course of the road as well as the available lanes. Herein, it can additionally be taken into account to what extent information about possible obstacles on the current lane is present from other fleet vehicles or an external server unit. Based on this information, a lane change to a lane, which is not drivable due to the current traffic situation, for example due to an accident, is for example recognized as not feasible due to the lack of practicability of this control command. Herein, it can additionally be taken into account that a lane change to a left lane for overtaking another motor vehicle immediately before a turn-off, which is to be approached by the motor vehicle according to the current travel route, is also classified as not feasible due to lack of practicability within the scope of the ascertainment of the feasibility. With the aid of the predetermined verification criteria, it can thus be relatively accurately and reliably ascertained to what extent individual control commands are feasible and the feasibility thereof would be reasonable, respectively.

In further advantageous configuration, it is provided that advantages, which are to be expected upon performing the respective control command, are respectively estimated and taken into account in ascertaining the control specification for the individual ascertained control commands, in that a working condition improvement to be expected upon performance with respect to the working condition of the corresponding evaluation unit accessing the sensor unit is respectively ascertained. For determining the control specification considering the individual previously ascertained feasibilities of the control commands, thus, the benefit of performing the individual control commands is first evaluated. This is effected in that an information gain for the overall system of sensor units of the motor vehicle is ascertained for each of the ascertained control commands, that is the improvements of the working conditions to be expected are ascertained. Thus, the gain is estimated, which is to be expected for a sensor if the ascertained control commands would be performed. The estimation of the advantage is effected based on the determination of a likelihood, which quantifies the potential improvement of the working conditions of the corresponding sensor unit. In addition thereto, the effect of the working condition improvement to be expected, that is the information gain effect, which is to be expected, can be quantified and be taken into account in ascertaining the control specification.

A control command, which involves that a motor vehicle travels more slowly than heretofore, in order that the viewing range of the front camera is improved, would for example be evaluated with higher advantage and thus with a higher working condition improvement than for example an acceleration of the motor vehicle for improving the viewing range of the rear camera. The reason for this is that the advantage for the safety and also the comfort of the driving operation is considerably greater by improved view in the front area of the motor vehicle than by improved view in the rear area.

By the estimation of the respective advantage of the individual ascertained control commands within the scope of the ascertainment of the control specification, thus, it can be particularly uniquely determined how reasonable the individual control commands actually are for the control of the motor vehicle.

In further advantageous configuration, it is provided that disadvantages, which are to be expected upon performing the respective control command, are respectively estimated and taken into account in ascertaining the control specification for the individual ascertained control commands. Thus, the cost is also evaluated, which would arise upon performing the individual ascertained control commands. This evaluation is effected in that cost increase values are respectively ascertained, which are to be expected upon performing the respective control command.

These cost increase values for example involve a quantification of the effort, which is to be expected by performing the ascertained control command, the reduction of comfort measure for the occupants of the vehicle, a possible safety risk for the occupants of the vehicle and other possible disadvantages, which are to be expected by performing the respective control command. The cost calculation in case of a speed reduction of the motor vehicle for improving the visibility conditions of the front camera is for example associated with a particularly low benefit since for example the energy consumption of the motor vehicle is reduced as well as the safety for the occupants of the motor vehicle as well as other traffic participants is reduced by slow drive of the motor vehicle. In contrast, an acceleration of the motor vehicle for improving the visibility conditions of the rear camera would have considerably higher cost increase values since a certain effort and increased energy consumption are associated with the acceleration of the motor vehicle on the one hand as well as the safety risk for the occupants and other traffic participants is increased by the faster drive of the motor vehicle. In ascertaining the disadvantages, the speed reduction of the motor vehicle for improving the working conditions for the front camera as the control command would also be estimated with the least disadvantages in this situation. In ascertaining the control specification, thus, it is also taken into account for the individual control commands to what extent they include potential disadvantages for the control of the motor vehicle. In ascertaining the control specification, thus, the possible effects of the control commands are particularly extensively verified to finally be able to identify the optimum control specification.

In further advantageous configuration, it is provided that the advantages and disadvantages estimated for the individual control commands are related to each other considering predetermined evaluation rules and are taken into account in ascertaining the control specification. The already mentioned working condition improvements, effects of these working condition improvements as well as the respective cost increase values, which are each associated with performing the ascertained control commands, are thus related to each other, whereby a cost-benefit ratio of the ascertained control commands is finally ascertained. To be able to relate the different values for the advantages and the disadvantages to each other, various evaluation rules are taken into account, that is certain conversion factors are taken into account. Finally, the optimization problem is solved such that the control specification for the motor vehicle is ascertained, which represents the solution of this optimization problem and thus has overall the best ratio of advantages to disadvantages.

In this relation of the estimated advantages and disadvantages, it is for example ascertained that the motor vehicle is controlled with a lower speed and measures for improving the viewing range of the rear camera should not be implemented for improving the working conditions of the front camera. Thus, in this example, an optimum value for the acceleration of the motor vehicle would be ascertained as the control specification. In accurately evaluating the ratio of the advantages and disadvantages, therefore, predetermined rules are finally taken into account, which are recorded in the conflict checking unit, to be able to estimate the individual estimated advantages and disadvantages in relation to each other.

Within the scope of the method, thus, a defined set of rules for evaluating the individual control commands is provided, by which the optimum control specification for the motor vehicle is finally particularly advantageously ascertained, according to which the motor vehicle is thereupon controlled by the vehicle control unit.

In a further advantageous configuration, it is provided that a ranking of the decision criteria is taken into account in ascertaining the control specification as the predetermined evaluation rules. Therefore, the evaluation rules allow that the individual control commands with their ascertained values for advantages and disadvantages are compared to each other and therein preset rules for solving the optimization problem, that is the evaluation of the cost-benefit ratio, are applied. Such a ranking of the decision criteria can for example involve that the safety of the vehicle occupants as well as of other traffic participants has always a higher priority than the comfort of the vehicle occupants, wherein this comfort in turn has a higher priority than the gain in time associated with a control of the motor vehicle. The gain in time finally can be classified as more relevant than energy savings, the energy savings in turn as more relevant than the emission reduction, which is possibly possible with the control of the motor vehicle according to the finally ascertained control specifications. A pure emission reduction in turn can be classified as more relevant than a pure improvement of the mode of operation of the sensors, which can for example be quantified based on an index of the sensor. With the aid of the ranking, the evaluation rule can thus be configured such that desired priorities are selected with respect to the control commands, which are finally performed as a part of the control specification. Thereby, a particularly reasonable control of the motor vehicle is allowed, which results in an improvement of working conditions of selected sensor units, but is particularly reasonable for the entire driving behavior of the motor vehicle at the same time.

In further advantageous configuration, it is provided that at least one of the following criteria is taken into account by the conflict checking unit as the decision criterion: A safety risk for occupants of the motor vehicle, a safety risk for motor vehicles, persons and/or objects in the environment of the motor vehicle, a comfort measure for occupants of the motor vehicle, a gain in time for the occupants of the motor vehicle, an energy saving of the motor vehicle, an emission reduction of the motor vehicle, the improvement of the working conditions of the respective evaluation units, an effort associated with the control of the control commands for the vehicle control unit, an effect of the control of the motor vehicle with respect to a current travel route of the motor vehicle. The predetermined decision criterion, which is finally taken into account together with the feasibility of the individual control commands in ascertaining the control specification for the vehicle control unit of the motor vehicle, can thus consider specifications to a safety risk of users or persons and other objects located outside of the motor vehicle. Further aspects, which are taken into account in ascertaining the control specification also in the form of preset decision criteria, relating to the comfort for the user of the motor vehicle, that is take into account that the driving behavior of the motor vehicle should be particularly comfortable for the occupants of the motor vehicle. The decision criteria additionally take into account that it is particularly often desired by users of the motor vehicle that a positive effect for the duration of travel for traveling on the travel route is achieved by the change of the travel route in performing the control specifications for improving the working conditions of the sensor units, thus, the travel time is shortened if possible. Further decision criteria take into account that the motor vehicle consumes particularly little energy and emits particularly low emissions according to the control specifications. In addition, the decision criteria can take into account that the working conditions of the individual sensor units, thus the indexes thereof, are improved or the control effort for controlling the motor vehicle according to the control specification is as low as possible. In addition, the current travel route of the motor vehicle is taken into account and thus, it is taken into account based on the decision criteria that the motor vehicle more or less follows the current travel route of the motor vehicle despite of an improvement of the working conditions of the sensor units. Thus, the actual travel destination of the motor vehicle is kept in view.

With the ascertained feasible control commands, which are for example: "change to the left lane", "change to the right lane", "remain in the center of the lane", "drive slightly further left on the same lane", "increase speed" or "decrease speed", it can be taken into account based on the decision criteria to what extent these individual control commands are maintained in ascertaining the control specification, that is are taken into account as a part of the control specification for the vehicle control unit. For the individual control commands, it can then for example be ascertained how the performance of this control command affects a safety risk for the occupants of the vehicle. For example, a lane change is evaluated with a relatively high safety risk, whereas remaining in the center of the lane by the motor vehicle is associated with a particularly low additional safety risk except for the general safety risk of the travel of the motor vehicle along the travel route. Analogously thereto, the individual control commands can be associated with an ascertained safety risk for motor vehicles, persons and/or objects in the environment of the motor vehicle.

The comfort measure for the occupants of the motor vehicle is for example relatively severely influenced by a lane change since it is associated with a slight change of direction and thus with a comfort reduction for the occupants of the motor vehicle. In contrast, a slight change of direction for driving further left on the current lane is associated with a considerably higher comfort measure for the occupants of the motor vehicle since they barely perceive the change of direction of the motor vehicle associated therewith.

The gain in time, which is associated with the ascertained control specification, for example takes into account that a lane change or also a change of the route for improving the working conditions of the individual sensors optionally results in extension of the travel time. With the decision criteria of energy saving and emission reduction, the extension of the driving route by implementing the corresponding control commands is also taken into account such that acceleration of the motor vehicle, which is associated with increased energy consumption and also with higher emission, is for example differently evaluated in the decision than for example deceleration or slight steering of the motor vehicle towards the left edge of the current lane.

For improving the working condition of the respective evaluation unit, only an index of the corresponding sensor unit is determined, which represents a measure of the quality of the sensor data. Thus, it is taken into account as the corresponding decision criterion how much this index of the individual sensor units would improve or deteriorate by performing the corresponding control commands. A lane change can for example pursue the purpose that more light is incident on a camera such that it can better capture the environment of the motor vehicle. The higher sensor data yield achieved by the improved view by the lane change is therefore associated with a higher index improvement than for example only slightly steering the motor vehicle to the left edge of the current lane, whereby only a slight improvement of the field of view and thus of the working conditions of the corresponding camera would be achieved.

The effort associated with the control of the control commands for the vehicle control unit is also quantified. For example, a change of the lane is associated with a greater effort than remaining in the center of the current lane by the motor vehicle. This is in particular relevant in more expensive driving maneuvers for improving the working conditions of the sensor units. It is also quantified to what extent the current travel route of the motor vehicle changes if the corresponding control commands are implemented. This is for example relevant if a lane change is desired or proposed in the vicinity of a desired exit ramp from an expressway. Such a lane change could optionally result in a considerable extension of the travel route since the desired exit ramp, which is preset according to the travel route, is for example missed, since the motor vehicle is on the left and not the right lane of the road. The mentioned decision criteria finally allow that the optimum control specification for the control of the motor vehicle is ascertained considering particularly many aspects and potential influences.

According to the disclosure, a control system for operating a motor vehicle is additionally provided, wherein the motor vehicle includes a conflict checking unit and a vehicle control unit for controlling the motor vehicle. The control system is configured to perform a method, as it was described above, for operating a motor vehicle. Herein, the conflict checking unit and the vehicle control unit can be two separated components in the motor vehicle, but it is also possible that both units are combined, for example are both parts of the path planning unit of the motor vehicle. In controlling the motor vehicle via the vehicle control unit, generally viewed, there are three important calculating operations. On the one hand, the travel route of the motor vehicle is determined, that is the travel path from the travel start to the travel destination is preset. In a further sub-unit of the vehicle control unit, the actual path planning is effected, that is, detailed driving specifications for traveling on the travel route are planned there. In a third subordinated planning operation within the vehicle control unit, the accurate details to the speed, control and acceleration are set by a controller. This controller for example ascertains, which driving speed is implemented for which period of time and for which driving route along the ascertained path for controlling the motor vehicle along the travel route. The conflict checking unit can now directly be a part of the second mentioned units, that is of the path planning. However, it is also possible that the conflict checking unit is arranged external to vehicle, that is, the corresponding ascertaining and calculating operations are performed by an external server. The ascertained control specification for the vehicle control unit is then communicated from the external server unit to the vehicle control unit in order that it can control the motor vehicle according to the ascertained control specification. Thus, different implementations of the control system are possible in a motor vehicle, whereby it becomes particularly flexible and adaptable.

According to the disclosure, a motor vehicle with multiple evaluation units accessing sensor units of the motor vehicle is additionally provided, which includes a control system for operating a motor vehicle, as it was described above. In addition, the motor vehicle is configured for at least partially autonomously driving.

The developments of the method as described herein include features which are also applicable to the control system and to the motor vehicle as described herein. For this reason, the corresponding developments of the method are not again described here with respect to the motor vehicle.

BRIEF DESCRIPTION OF THE DRAWINGS

These and other aspects and advantages will become more apparent and more readily appreciated from the following description of example embodiments, taken in conjunction with the accompanying drawings, of which.

DETAILED DESCRIPTION

Figure 1:
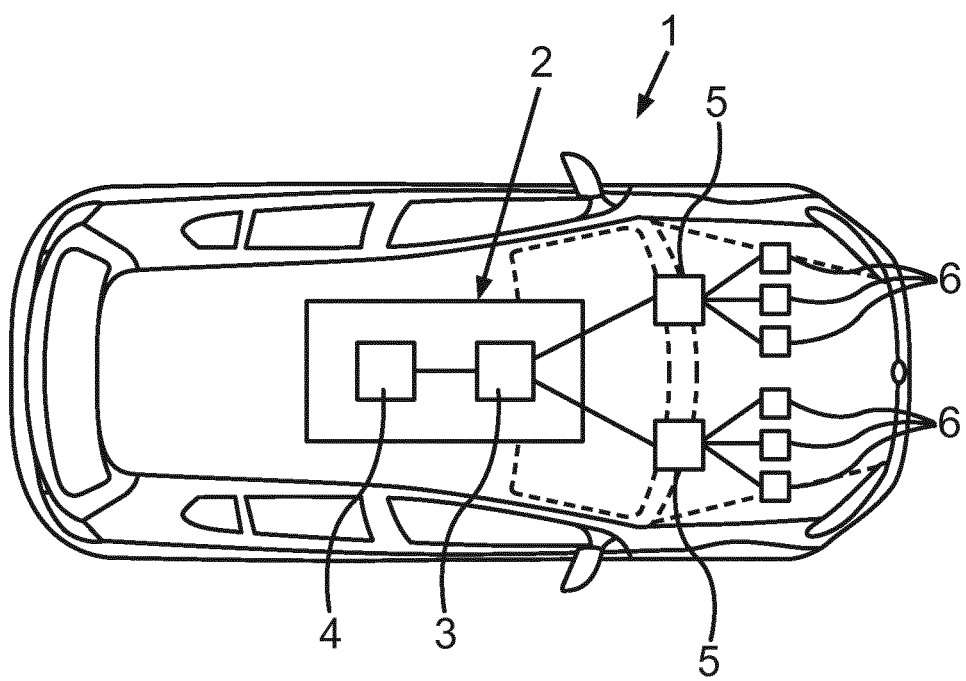
FIG. 1 is a schematic representation of a motor vehicle with a control system for operating the motor vehicle.

The embodiments explained in the following are example embodiments. In the example embodiments, the described components of the embodiments respectively represent individual features of the disclosure to be considered independently of each other, which also respectively develop the disclosure independently of each other and thereby are also to be regarded in an individual manner or in a different manner than the shown combination. Furthermore, the described embodiments are also capable of being supplemented by further features described herein.

In the drawings, functionally identical elements are each provided with the same reference characters.

In FIG. 1, a motor vehicle 1 with a control system 2 for operating the motor vehicle 1 is outlined. The control system 2 includes a conflict checking unit 3 as well as a vehicle control unit 4. The vehicle control unit 4 can intervene in the longitudinal control and/or the transverse control of the motor vehicle 1 on the one hand as well as accelerate and decelerate the motor vehicle 1. In addition, the motor vehicle 1 includes multiple sensor units 6, the sensor data of which is evaluated and processed by evaluation units 5. The sensor units 6 are for example external cameras, radar devices, lidar devices, driver assistance systems or vehicle modules, which are for example configured for localization, location or object detection of the environment of the motor vehicle 1. The sensor units 6 can be present either as individual sensors, for example as individual external cameras of the motor vehicle 1, or as sensor systems, for example as a camera system, which includes cameras both in the front and in the rear and in the lateral area of the motor vehicle 1. The evaluation units 5 can be responsible for multiple such sensor units 6 or optionally be integrated in a single sensor.

The evaluation units 5 can additionally access data recorded in the motor vehicle 1, for example maps or information of a prior travel on the same travel route stored there, as well as fleet data or other sensor data and infrastructure data, respectively.

Figure 2:
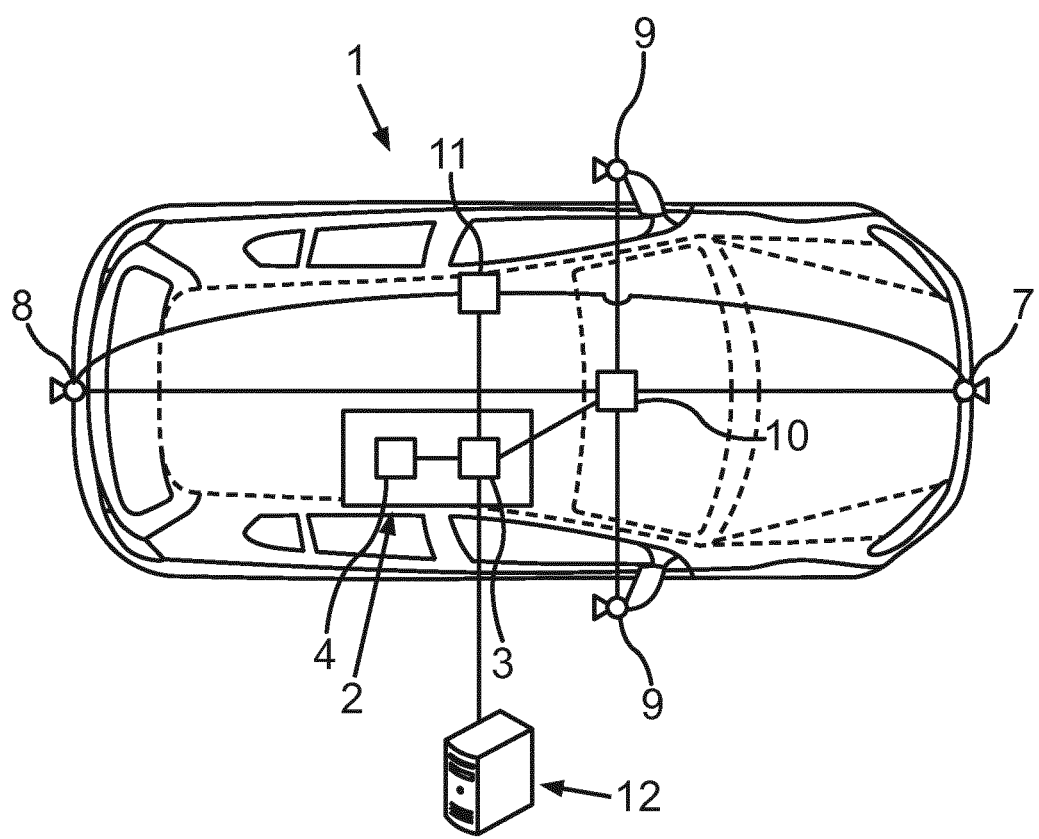
FIG. 2 is a schematic representation of a motor vehicle with a control system for operating the motor vehicle with a communication link with an external server.

In FIG. 2, a motor vehicle 1 is outlined, which includes a front camera 7, a rear camera 8, two lateral cameras 9 as well as a distance controller 11 as the sensor unit 6. Here, the corresponding evaluation component of the distance controller 11 as well as a camera system evaluation unit 10 are present as the evaluation units 5. The distance controller 11 as well as the camera system evaluation unit 10 both communicate their corresponding sensor data from the front camera 7 and the rear camera 8 or from all of the four cameras to the conflict checking unit 3, which additionally gets communicated information to the travel route as well as to the current road and traffic conditions from an external server unit 12.

Figure 3:
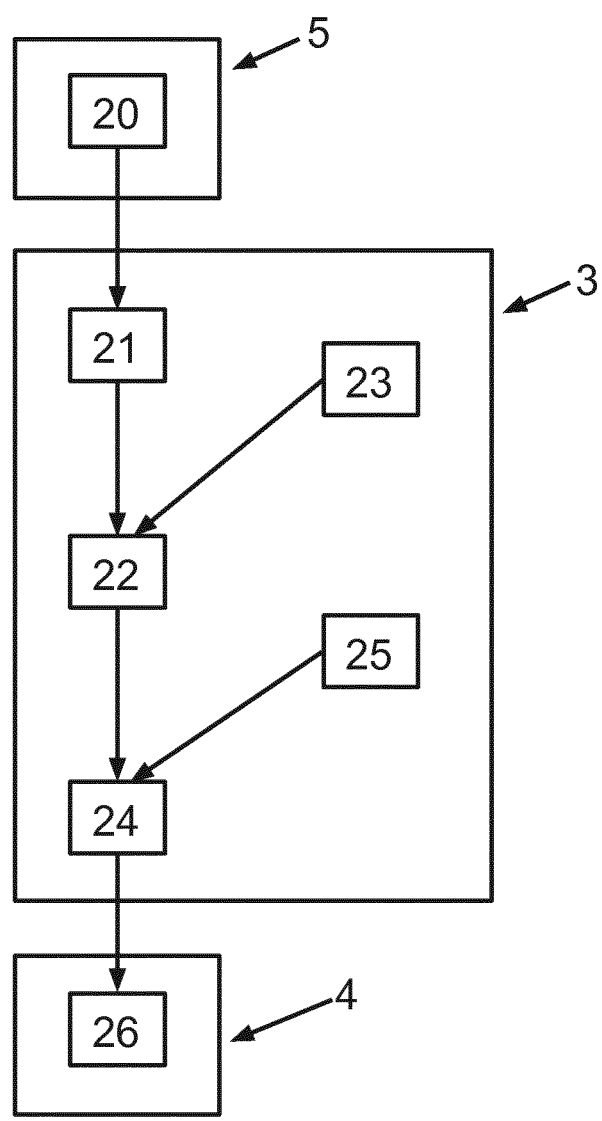
FIG. 3 is a schematic representation of a method for operating a motor vehicle for ascertaining a control specification.

In FIG. 3, the individual operations of the method for operating the motor vehicle 1, which includes multiple evaluation units 5 accessing sensor units 6 of the motor vehicle 1, the conflict checking unit 3 as well as the vehicle control unit 4 for controlling the motor vehicle 1. Within the scope of the method, the evaluation units 5 accessing the sensor units 6 first ascertain requests 20 to the control of the motor vehicle 1, the performance or realization of which results in an improvement of the working conditions of the evaluation units 5 of the sensor units 6. These requests 20 can contain either only the information that the working conditions are unfavorable. For example, in case of the front camera 7, the camera system evaluation unit 10 can ascertain the message "light conditions unfavorable" as the request 20. Alternatively thereto, a maneuver such as for example a lane change for improving the visibility conditions can be ascertained by the camera system evaluation unit 10 in the form of the request 20.

Thereupon the thus ascertained requests 20 are communicated to the conflict checking unit 3, which ascertains control commands 21 for implementing the communicated requests 20. Thus, the control commands 21 translate the requests 20 into concrete control commands for the vehicle control unit 4 of the motor vehicle 1. For example, if the camera system evaluation unit 10 has determined that the front camera 7 is restricted in its field of view, for example by another motor vehicle 1 traveling in front of the motor vehicle 1, the conflict checking unit 3 ascertains the actual control commands 21 for controlling the motor vehicle 1 either from the request 20 "light conditions unfavorable" or from the request 20 "perform lane change for improving the light conditions". These control commands 21 then for example contain details to the desired lane change for improving the working conditions of the front camera 7.

In a next operation, the conflict checking unit 3 respectively ascertains a feasibility 22 for the individual previously ascertained control commands 21. Herein, the control commands 21 are verified with respect to contradictions and practicability considering predetermined verification criteria 23. These verification criteria 23 take into account if contradictive control commands 21 due to multiple requests 20 of an evaluation unit 5 and/or if target conflicts of control commands 21 due to requests 20 of different evaluation units 5 are present. In addition, it is taken into account by the predetermined verification criteria 23 if the practicability of the respective control commands 21 is possible due to current road conditions, traffic conditions and/or a current travel route of the motor vehicle 1.

If the motor vehicle 1 for example travels within a city in relatively dense city traffic, the viewing ranges of the vehicle sensor technology can be restricted due to the dense city traffic, for example of the front camera 7, the rear camera 8 as well as the lateral cameras 9. In this situation, it could be reasonable that a vehicle traveling in an automated manner meanwhile increases the distance to further vehicles traveling in front of the motor vehicle 1, for example in that the motor vehicle 1 swings slightly to the left or right in remaining on the same lane. By this swing to the left or right, the front camera 7 can for example better estimate the traffic flow in front of the motor vehicle 1. Thereby, it could be better predicted if the traffic will soon come to a standstill, whereby a relatively early and comfortable braking of the motor vehicle 1 is possible.

A first request 20 of the camera system evaluation unit 10 is for example: "increase the distance to other objects to the front". In addition, the camera system evaluation unit 10 requests that the rear camera 8 also needs an enlarged field of view and communicates the request 20 "increase the distance to the rear vehicle to enlarge the field of view of the rear camera 8" thereto. However, these two requests 20 are directly contrary to each other. Thus, it is not possible that both control commands 21 related to the requests 20 are feasible.

Target conflicts of control commands 21 for example arise if multiple evaluation units 5 of sensor units 6 communicate requests 20 to the conflict checking unit 3. For example, the camera system evaluation unit 10 notifies that the front camera 7 desires a lane change to the right lane for improving the visibility conditions, since the motor vehicle 1 would travel in the shadow there and thus the front camera 7 would be less blinded. However, a lidar device as a further sensor unit 6 notifies with the aid of a corresponding request 20 that this device could presumably see more objects, which would be beneficial for localizing the motor vehicle 1, on the left lane. The radar device in turn communicates with its evaluation unit 5 to the conflict checking unit 3 that the motor vehicle 1 should remain on the current lane since the radar device can be particularly advantageously overview the other traffic participants from this position. Thus, target conflicts of control commands 21 are present here due to requests 20 of different evaluation units 5. Therefore, both control commands 21 are not feasible at least at the same time.

The practicability of the control commands 21 is additionally assessed considering for example the number of the lanes on the road or the current traffic density. With particularly dense city traffic, a lane change can for example currently not be practicable. Thus, the practicability of the corresponding control command 21 does not exist. With lack of practicability, however, feasibility 22 of the control command 21 either does not exist.

After the feasibility 22 of the control commands 21 has been ascertained, the ascertainment of a control specification 24 for the vehicle control unit 4 of the motor vehicle 1 is effected. The control specification 24 is determined based on the previously ascertained feasibilities 22 as well as considering predetermined decision criteria 25. Herein, the ascertainment of the control specification 24 is finally based on an advantage-disadvantage estimation, that is on a type of cost-benefit calculation. For example, an advantage is a quantified value, which indicates to what extent the evaluation unit 5 of a sensor unit 6 estimates that the index of the sensor unit 6 is improved if the corresponding control command 21 is performed. Thus, the working condition improvement, that is the information gain by performing the respective control command 21 as well as an effect of this working condition improvement to be expected, that is an information gain effect, is basically estimated for the evaluation unit 5. An advantage of a lane change for example would be that a better observation of the traffic, a better estimation of the traffic flow or generally an increased light intensity, which is received by the front camera 7, is achieved. These advantages are taken into account with a likelihood, with which they will potentially occur, in determining the control specification 24. Thus, the potential consequences of performing the individual control commands 21 are estimated. The ascertained disadvantages are estimated by the determination of potential cost increase values due to the performance of the ascertained control commands 21. Such disadvantages are for example that temporarily an increased safety risk for the occupants of the motor vehicle 1, a reduced comfort measure and long-term a poorer lane choice with regard to the next turn due to the current travel route arise by a lane change. These potential disadvantages are also quantified and numbered with a potential likelihood.

Thereupon, the advantages and disadvantages are transferred to a same unit, which is neutral, with the aid of certain conversion factors. The conflict checking unit 3 finally determines the solution of the optimization problem numbered by the advantages and disadvantages in that all of the advantages and disadvantages as well as the transverse relation thereof to the possible control commands 21 are taken into account. The solution of this optimization problem then results in the control specification 24, which overall has the best advantage to disadvantage ratio. Thereupon, this control specification 24 is communicated to the vehicle control unit 4, which thereupon controls the motor vehicle 1 according to the ascertained control specification 24. The control specification 24 thus becomes a motor vehicle control command 26, which is available to the vehicle control unit 4 and is implemented by it.

In estimating the advantages and disadvantages considering the predetermined evaluation rules, there applies a ranking of the decision criteria. This ranking, which is referred to as evaluation rule, for example provides the following prioritization order, beginning with the decision criterion 25 with the highest priority: safety, comfort measure, gain in time, energy saving, emission reduction, improvement of the working conditions of the respective evaluation units 5. In the simplest case, thus, the optimization problem is solved by this simple rule, that is this priority order. Further possible decision criteria 25 are considering the effort associated with the control of the motor vehicle 1 according to the control commands 21 for the vehicle control unit 4 as well as the effect of the control of the motor vehicle 1 according to the control commands 21 with respect to a current travel route of the motor vehicle 1. Thus, the control commands 21 will for example always be incorporated as a part of the control specification 24, which reduce the safety risk for occupants or motor vehicle, persons or objects outside of the motor vehicle 1, compared to control commands 21, which only increase the comfort for the occupants of the motor vehicle 1.

In these examples, the conflict checking unit 3 was always a part of the control system 2 of the motor vehicle 1. However, it is also possible that the conflict checking unit 3 is integrated external to vehicle, for example in the server unit 12, or is a part of the vehicle control unit 4.

Overall, the method for operating the motor vehicle 1 allows that corresponding requests 20 are first ascertained for improving working conditions of evaluation units 5 of sensor units 6, which in turn are transferred into control commands 21. The feasibility 22 of these control commands 21 is thereupon ascertained, namely considering corresponding preset verification criteria 23. After this verification of the feasibility 22 of the control commands 21, the control specifications 24 are finally ascertained considering the decision criteria 25, which result in a particularly reasonable and optimized control of the motor vehicle 1 by the vehicle control unit 4.

The basic idea of the method for operating the motor vehicle 1 is in that a first device in the motor vehicle 1, that is an evaluation unit 5, puts a request 20 to a second device in the motor vehicle 1, that is a conflict checking unit 3, with respect to the maneuvers, which the conflict checking unit 3 further processes considering further information and in turn sets a control specification 24 to the vehicle control unit 4 or optionally its maneuver and path plans, respectively.

The evaluation unit 5 can access a sensor unit 6, which wishes to improve its working conditions by a driving maneuver, for example a lane change. For example, the front camera 7 can pursue the target to avoid backlight as possible, which could for example be implemented by a lane change. However, the evaluation unit 5 can also access a functional module for a driver assistance system, which wishes to obtain additional information by a driving maneuver, for example for predicting the travel route. This driver assistance system can for example be a distance controller 11, which desires a larger distance to a motor vehicle 1 traveling in front of it, whereby it finally puts a request 20 to reduction of the driving speed.

However, the evaluation unit 5 can also be a driver assistance system, which wishes to optimize its information basis by a driving maneuver derived from previous knowledge. For example, for locating the motor vehicle 1, minimization of disturbances of the corresponding GPS signal due to building development and topology of the environment of the motor vehicle 1 is formulated in the form of a corresponding request 20. However, the previous knowledge can also originate from a map recorded in the motor vehicle 1, from a server unit 12, for example based on fleet data, or from other motor vehicles 1 or infrastructure devices in the vehicle environment.

Since multiple sensor units 6 with their evaluation units 5 can put different requests 20 at the same time and thus multiple evaluation units 5 exist in parallel, the conflict checking unit 3 can examine and interpret the individual requests 20 with respect to contradictions and target conflicts. Furthermore, the conflict checking unit 3 verifies the basic practicability of the requests 20, which are present in the form of defined control commands 21 to the conflict checking unit 3. The practicability of the control commands 21 for example involves information about the availability of further lanes on the roadway to be able to estimate if a lane change is basically possible. Thereupon, the conflict checking unit 3 only considers the control commands 21, which were provided from requests 20 of evaluation units 5, the verification of which for feasibility 22 considering the verification criteria 23 was successful. Thereupon, these feasible control commands 21 are provided to the maneuver and path planning of the requests 20, which results in the fact that a concrete control specification 24 is ascertained considering decision criteria 25, which are finally communicated to the vehicle control unit 4. Such maneuver planners and path planners of requests 20 for the in particular autonomously driving motor vehicle 1 can fundamentally be very differently realized. Thus, there are fundamentally different interfaces for influencing the maneuver and path planner, respectively. Therefore, it is proposed that an abstraction between the request 20, that is the basic request to the maneuver and path planning, respectively, which is given by the control commands 21, and the specific implementation of the requests 20, that is the control specification 24, is effected. Thus, the conflict checking unit 3 represents a type of interface port. In addition, the conflict checking unit 3 can be assisted by the server device 12 or be completely integrated in the server unit 12. Of course, a communication link, for example a mobile radio link, between the server device 12 and the vehicle control unit 4 of the motor vehicle 1 is required hereto.

However, the determination of the control specification 24 can also be directly adopted by the actual maneuver and path planning, respectively, and thus by the vehicle control unit 4 instead of the conflict checking unit 3. In this case, the conflict checking unit 3 would be a constituent of the vehicle control unit 4, that is of the maneuver and path planning, respectively, and not an independent vehicle component.

In the simple case, the evaluation units 5 respectively only put a request 20 to the conflict checking unit 3, which for example involves a maneuver for improving a special metric if it has fallen below a threshold value. An example hereto is a front camera 7, which is faced with unfavorable light conditions. Therefore, a metric is proposed, which the conflict checking unit 3 uses for assessing its maneuvers, for example the evasion to another lane for improving the light conditions. Hereto, a quality measure with threshold value is defined for each contemplable sensor unit 6, which can include a single sensor unit 6, a sensor system and a driver assistance system. In a more complex case, such as for example the location or the prediction of the motor vehicle 1, the evaluation unit 5 can also directly request a special maneuver, such as for example a lane change. Thereupon, the conflict checking unit 3 ascertains concrete control commands 21 from these requests 20 and thereupon verifies them with respect to their feasibility 22.

Upon final determination of the control specification 24, the conflict checking unit 3 ascertains, by which maneuver more information can be collected. Thereto, the conflict checking unit 3 calculates, from which position the region of interest can be viewed, for example with the aid of raytracing. Alternatively thereto, the local environment of the motor vehicle 1 can be divided into a grid and it can be determined for each grid cell how well a movement of the motor vehicle 1 into this grid cell would improve the metric. Subsequently, this information, that is the ascertained control specification 24, is communicated to the vehicle control unit 4. Alternatively thereto, only the individual information can also be communicated to the vehicle control unit 4, which thereupon ascertains itself the control specification 24 and thus the motor vehicle control commands 26. If the driving situation allows it and the information gain by the trajectory change outweighs the cost associated with the corresponding change of the driving behavior, the corresponding trajectory change is planned within the scope of the control specification 24 and a corresponding control of the motor vehicle 1 is finally performed by the vehicle control unit 4.

Since it is partially statistic, location-related information, it can already be precomputed and recorded in a storage unit of the motor vehicle 1. Thereby, it can already be known to the conflict checking unit 3 that a considerably better localization information can be captured from some lanes than from other lanes such that this lane is selected as the lane as a particularly reasonable lane with priority within the scope of the control specification 24.

Thus, if it is for example overall recorded in the motor vehicle 1 as the drive destination that the motor vehicle 1 is to drive from a point A to a point B, the conflict checking unit 3 determines, which is the next destination before the maneuver, for example if overtaking the slow front vehicle is reasonable. Herein, it is first estimated if the driving maneuver basically seems to be feasible. Thus, it is examined if all of the required sensor unit information is present. Herein, an actual to set information state comparison is for example effected. If certain sensor information is absent, such as for example the view to the oncoming traffic, to be able to carry out the driving maneuver, it is determined what the motor vehicle 1 has to change on its current travel route to get this information. Thus, requests 20 are formulated, which result in the desired improvement of the working conditions of the corresponding sensor units 6 and the evaluation units 5 of these sensor units 6, respectively. In this case, the result would for example be that different sensor units 6 have to capture certain environmental regions of the motor vehicle 1. It is also possible that it is ascertained that an Internet link with a server device 12 has to be established to be able to retrieve certain information to the lane course. Alternatively thereto, the driver of the motor vehicle 1 can be asked if he for example wishes to accept detours, for example related to a loss of time, to thereby increase the traveling comfort. The information can come from the sensor units 6 themselves or from the evaluation units 5 of the sensor units 6.

The conflict checking unit 3 receives the requests 20, which would have to be carried out to improve the working conditions of the sensor units 6. Corresponding control commands 21 are ascertained from these requests 20, which are first examined with respect to the feasibility 22 considering the verification criteria 23. Herein, the freedom of conflict is verified as well as the practicability. Optionally, conflicts can also be temporarily solved, for example in that first swiveling to the left and thereafter swiveling to the right on the current lane is effected. If multiple possible control commands 21 are feasible and reasonable to get the absent information, an advantage-disadvantage calculation is made for each possible control command 21, thus a type of cost-benefit estimation is performed. The potential advantages and disadvantages are modelled with the aid of likelihood values and related to each other. Subsequently, the control commands 21 are selected and reproduced in the form of a control specification 24, which represent the best advantage-disadvantage ratio. This control specification 24 is then finally executed by the vehicle control unit 4 as the motor vehicle control command 26.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for operating a motor vehicle, the motor vehicle including evaluation units which access sensor units of the motor vehicle, a conflict checking unit, and a vehicle control unit configured to control the motor vehicle, the method comprising:

ascertaining, by corresponding evaluation units, requests relating to a control of the motor vehicle for improving working conditions of the evaluation units which access the sensor units;

communicating the requests to the conflict checking unit;

ascertaining, by the conflict checking unit, control commands to control the motor vehicle by the vehicle control unit to implement the requests;

ascertaining a respective feasibility of the control commands based on predetermined verification criteria with respect to contradictions of each of the control commands with each other and a practicability of each of the control commands;

ascertaining a control specification for the vehicle control unit based on the feasibilities of the control commands and predetermined decision criteria; and controlling the motor vehicle according to the control specification by using the vehicle control unit.

2. The method according to claim 1, wherein ascertaining the requests by the corresponding evaluation units includes accessing individual sensor units among the sensor units, accessing sensor systems, and/or accessing a driver assistance system, and the method further comprises providing data which is recorded in the motor vehicle to the evaluation units and/or providing data which is communicated to the motor vehicle to the evaluation units.

3. The method according to claim 1, wherein ascertaining the respective feasibility of the control commands includes:

determining whether contradictive control commands exist due to a plurality of requests of one of the evaluation units and/or due to target conflicts of control commands based on requests of different evaluation units, and/or determining the practicability of each of the control commands based on current road conditions, traffic conditions, and/or a current travel route of the motor vehicle.

4. The method according to claim 1, wherein ascertaining the control specification includes estimating advantages which are to be expected upon performing respective control commands, the estimating advantages including estimating an expected improvement to the working conditions of the evaluation units which access the sensor units.

5. The method according to claim 4, wherein ascertaining the control specification includes estimating disadvantages which are to be expected upon performing respective control commands.

6. The method according to claim 5, wherein ascertaining the control specification includes relating the advantages and disadvantages to each other based on predetermined evaluation rules.

7. The method according to claim 6, wherein the predetermined evaluation rules include a ranking of the predetermined decision criteria.

8. The method according to claim 1, wherein the predetermined decision criteria includes:

a safety risk for occupants of the motor vehicle, a safety risk for motor vehicles, persons, and/or objects in an environment of the motor vehicle, a comfort measure for the occupants of the motor vehicle, a gain in time for the occupants of the motor vehicle, an energy saving of the motor vehicle, an emission reduction of the motor vehicle, an improvement of the working conditions of the respective evaluation units, an effort associated with control of the control commands for the vehicle control unit, or an effect of the control of the motor vehicle with respect to a current travel route of the motor vehicle.

9. A control system for operating a motor vehicle, the control system comprising:
a vehicle control unit; and
a conflict checking unit configured to:
receive requests relating to a control of the motor vehicle for improving working conditions of evaluation units of the motor vehicle which access sensor units of the motor vehicle,
ascertain control commands to control the motor vehicle by the vehicle control unit to implement the requests,
ascertain a respective feasibility of the control commands based on predetermined verification criteria with respect to contradictions of each of the control commands with each other and a practicability of each of the control commands, and
ascertain a control specification for the vehicle control unit based on the feasibilities of the control commands and predetermined decision criteria,
wherein the vehicle control unit is configured to control the motor vehicle according to the control specification.

10. The control system according to claim 9, wherein the conflict checking unit is configured to ascertain the respective feasibility of the control commands by:
determining whether contradictive control commands exist due to a plurality of requests of one of the evaluation units and/or due to target conflicts of control commands based on requests of different evaluation units, and/or
determining the practicability of each of the control commands based on current road conditions, traffic conditions, and/or a current travel route of the motor vehicle.

11. The control system according to claim 9, wherein the conflict checking unit is configured to ascertain the control specification by estimating advantages which are to be expected upon performing respective control commands, the estimating advantages including estimating an expected improvement to the working conditions of the evaluation units which access the sensor units.

12. The control system according to claim 11, wherein the conflict checking unit is configured to ascertain the control specification by estimating disadvantages which are to be expected upon performing respective control commands.

13. The control system according to claim 12, wherein the conflict checking unit is configured to ascertain the control specification by relating the advantages and disadvantages to each other based on predetermined evaluation rules.

14. The control system according to claim 13, wherein the predetermined evaluation rules include a ranking of the predetermined decision criteria, and the predetermined decision criteria includes:
a safety risk for occupants of the motor vehicle,
a safety risk for motor vehicles, persons, and/or objects in an environment of the motor vehicle,
a comfort measure for the occupants of the motor vehicle,
a gain in time for the occupants of the motor vehicle,
an energy saving of the motor vehicle,
an emission reduction of the motor vehicle,
an improvement of the working conditions of the respective evaluation units,
an effort associated with control of the control commands for the vehicle control unit, or
an effect of the control of the motor vehicle with respect to a current travel route of the motor vehicle.

15. A motor vehicle, comprising:
sensor units;
evaluation units configured to access the sensor units; and
a control system including:
a vehicle control unit, and
a conflict checking unit configured to:
receive requests from the evaluation units relating to a control of the motor vehicle for improving working conditions of the evaluation units,
ascertain control commands to control the motor vehicle by the vehicle control unit to implement the requests,
ascertain a respective feasibility of the control commands based on predetermined verification criteria with respect to contradictions of each of the control commands with each other and a practicability of each of the control commands, and
ascertain a control specification for the vehicle control unit based on the feasibilities of the control commands and predetermined decision criteria,
wherein the vehicle control unit is configured to control the motor vehicle according to the control specification.

16. The motor vehicle according to claim 15, wherein
the evaluation units are configured to ascertain the requests by accessing individual sensor units among the sensor units, accessing sensor systems, and/or accessing a driver assistance system of the motor vehicle, and
the evaluation units are configured to receive data which is recorded in the motor vehicle and/or receive data which is communicated to the motor vehicle.

17. The motor vehicle according to claim 15, wherein the conflict checking unit is configured to ascertain the respective feasibility of the control commands by:
determining whether contradictive control commands exist due to a plurality of requests of one of the evaluation units and/or due to target conflicts of control commands based on requests of different evaluation units, and/or
determining the practicability of each of the control commands based on current road conditions, traffic conditions, and/or a current travel route of the motor vehicle.

18. The motor vehicle according to claim 15, wherein the conflict checking unit is configured to ascertain the control specification by estimating advantages which are to be expected upon performing respective control commands, the estimating advantages including estimating an expected improvement to the working conditions of the evaluation units which access the sensor units.

19. The motor vehicle according to claim 18, wherein
the conflict checking unit is configured to ascertain the control specification by estimating disadvantages which are to be expected upon performing respective control commands, and by relating the advantages and disadvantages to each other based on predetermined evaluation rules.

20. The motor vehicle according to claim 19, wherein
the predetermined evaluation rules include a ranking of the predetermined decision criteria, and the predetermined decision criteria includes:
a safety risk for occupants of the motor vehicle,
a safety risk for motor vehicles, persons, and/or objects in an environment of the motor vehicle,
a comfort measure for the occupants of the motor vehicle,
a gain in time for the occupants of the motor vehicle,
an energy saving of the motor vehicle,
an emission reduction of the motor vehicle, an improvement of the working conditions of the respective evaluation units, an effort associated with control of the control commands for the vehicle control unit, or an effect of the control of the motor vehicle with respect to a current travel route of the motor vehicle.

\* \* \* \* \*